US009525534B2

(12) United States Patent
Lee et al.

(10) Patent No.: US 9,525,534 B2
(45) Date of Patent: Dec. 20, 2016

(54) METHOD AND DEVICE FOR TRANSMITTING AND RECEIVING FLOODING SIGNAL IN WIRELESS COMMUNICATION SYSTEM

(71) Applicant: LG Electronics Inc., Seoul (KR)

(72) Inventors: Jihyun Lee, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 14/409,319

(22) PCT Filed: Jun. 13, 2013

(86) PCT No.: PCT/KR2013/005226
§ 371 (c)(1),
(2) Date: Dec. 18, 2014

(87) PCT Pub. No.: WO2013/191413
PCT Pub. Date: Dec. 27, 2013

(65) Prior Publication Data
US 2015/0180633 A1    Jun. 25, 2015

Related U.S. Application Data

(60) Provisional application No. 61/661,321, filed on Jun. 18, 2012.

(51) Int. Cl.
*H04B 7/00* (2006.01)
*H04L 5/00* (2006.01)
*H04W 4/06* (2009.01)
*H04W 72/04* (2009.01)
(Continued)

(52) U.S. Cl.
CPC ........... *H04L 5/0053* (2013.01); *H04L 5/0033* (2013.01); *H04L 5/0048* (2013.01); *H04W 4/005* (2013.01); *H04W 4/06* (2013.01); *H04W 72/0406* (2013.01); *H04L 5/0023* (2013.01); *H04L 45/32* (2013.01)

(58) Field of Classification Search
CPC ....... H04W 40/24; H04W 40/26; H04W 40/32
USPC .......................... 370/310, 312, 328, 329, 338
See application file for complete search history.

(56) References Cited

U.S. PATENT DOCUMENTS 7,239,619 B2 * 7/2007 Tobe .................. H04M 15/8016
370/331
7,266,386 B2 * 9/2007 Kim .................... H04W 52/343
370/328
(Continued)

FOREIGN PATENT DOCUMENTS

KR    10-2012-0026115    3/2012

*Primary Examiner* — Dmitry H Levitan
(74) *Attorney, Agent, or Firm* — Dentons US LLP (57) ABSTRACT

One embodiment of the present invention relates to a method for transmitting and receiving a signal by a second UE in a wireless communication system, comprising the steps of: receiving a message from a first UE; and determining whether to participate in flooding of the received message, wherein if it is determined to participate in the flooding, the second UE transmits the received message a preset number of times through a preset resource region for a third UE, and a reference signal related to the message transmitted for the third UE is common to one or more UEs which have received the message from the first UE and participate in the flooding.

12 Claims, 7 Drawing Sheets

(51) Int. Cl.
*H04W 4/00* (2009.01)
*H04L 12/721* (2013.01)

(56) References Cited

U.S. PATENT DOCUMENTS

| | | | | |
|---|---|---|---|---|
| 7,355,991 | B2* | 4/2008 | Huang | H04L 45/00 |
| | | | | 370/312 |
| 7,729,336 | B2* | 6/2010 | Pun | H04W 56/0015 |
| | | | | 370/321 |
| 8,098,608 | B1* | 1/2012 | Curry | H04W 40/24 |
| | | | | 370/310 |
| 8,194,541 | B2* | 6/2012 | Leppanen | H04W 40/246 |
| | | | | 370/229 |
| 8,351,417 | B2* | 1/2013 | Chen | H04L 45/00 |
| | | | | 370/217 |
| 2004/0218557 | A1 | 11/2004 | Kim et al. | |
| 2005/0030921 | A1 | 2/2005 | Yau | |
| 2006/0245360 | A1 | 11/2006 | Ensor et al. | |
| 2008/0002640 | A1 | 1/2008 | Westphal | |

* cited by examiner

METHOD AND DEVICE FOR TRANSMITTING AND RECEIVING FLOODING SIGNAL IN WIRELESS COMMUNICATION SYSTEM

This application is a 35 USC §371 National Stage entry of International Application No. PCT/KR2013/005226 filed on Jun. 13, 2013 and claims priority to U.S. Provisional Application No. 61/661,321 filed Jun. 18, 2012, all of which are incorporated by reference in their entirety herein.

TECHNICAL FIELD

This disclosure relates to a wireless communication system, and more particularly, to a method and device for transmitting and receiving a flooding signal.

BACKGROUND ART

Wireless communication systems are widely deployed to provide various kinds of communication services such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Device-to-device (D2D) communication represents a communication scheme of establishing a direct link between user equipments (UEs) such that the UEs directly exchanges services such as voice and data without assistance from an evolved NodeB (eNB). D2D communication may include UE-to-UE communication and peer-to-peer communication. In addition, the D2D communication scheme may be applied to machine-to-machine c (M2M) communication, machine type communication (MTC), etc.

D2D communication is considered as one of measures to address load to an eNB according to rapidly increasing data traffic. For example, according to D2D communication, since devices exchange data directly, not through an eNB as in the conventional wireless communication systems, overload to the network may be reduced. In addition, with introduction of D2D communication, the procedures for the eNB may be simplified, power consumption for devices participating in D2D communication may be reduced, data transmission rate increase, the capacity of a network may increase, load may be distributed, and cell coverage may be extended.

DISCLOSURE

Technical Problem

An object of the present invention is to provide elements which are needed to enable transmission/reception of a flooding signal in D2D communication.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to a first aspect of the present invention, provided herein is a method for transmitting and receiving a signal by a second device in a wireless communication system, the method including receiving a message from a first device, and determining whether to participate in flooding of the received message, wherein, when determining to participate in the flooding, the second device transmits the received message for a third device a predetermined number of times through a predetermined resource region, wherein a reference signal related to the message transmitted for the third device is common to one or more devices that receives the message from the first device and participates in the flooding.

According to a second aspect of the present invention, provided herein is a second device for transmitting and receiving a signal in a wireless communication system, including a receive module, and a processor, wherein the processor is configured to receive a message from a first device and determine whether to participate in flooding of the received message, wherein, when determining to participate in the flooding, the second device transmits the received message for a third device a predetermined number of times through a predetermined resource region, wherein a reference signal related to the message transmitted for the third device is generated in the same manner as generation of a reference signal related to the message received from the first device.

The first and second aspects of the present invention may include the following details.

The reference signal related to the message transmitted for the third device may be generated based on a generation parameter containing an identification number allocated to the message.

The identification number may depend on change of the message.

The reference signal related to the message transmitted for the third device may be generated in the same manner as generation of a reference signal related to the message received from the first device.

A frequency region in the predetermined resource region may be identical to a resource region for receiving the message from the first device.

The predetermined resource region may be common to the one or more devices to receive the message from the first device and participate in the flooding.

When the message received from the first device indicates that the message is intended for flooding, or when the second device receives, from the first device, a command to participate in the flooding, the second device may determine to participate in the flooding.

When the message is identical to a message related to flooding having the second device already participating therein, the second device may determine not to participate in the flooding.

When receiving a message different from the message received from the first device within the predetermined number of times, the second device may participate in flooding of the different message after the predetermined number of times of the transmission is completed.

When receiving a message identical to the message received from the first device within the predetermined number of times, the second device may determine not to participate in flooding of the identical message.

A cyclic prefix applied to the message transmitted for the third device may be set to be longer than a cyclic prefix applied to a message intended for an operation other than flooding.

Phase shift based on a parameter related to the second device may be applied to the message transmitted for the third device.

The first device may be one of a base station and a user equipment, and the second device and the third device may be user equipments.

Advantageous Effects

According to embodiments of the present invention, devices may efficiently perform flooding in D2D communication. In addition, extension of coverage of an eNB and improvement of reception performance may be achieved through flooding.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIGS. 6 (A) and 6(B) illustrate D2D communication and flooding;

BEST MODE

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

Generals of LTE/LTE-A system to which the present invention is applicable

Figure 1:
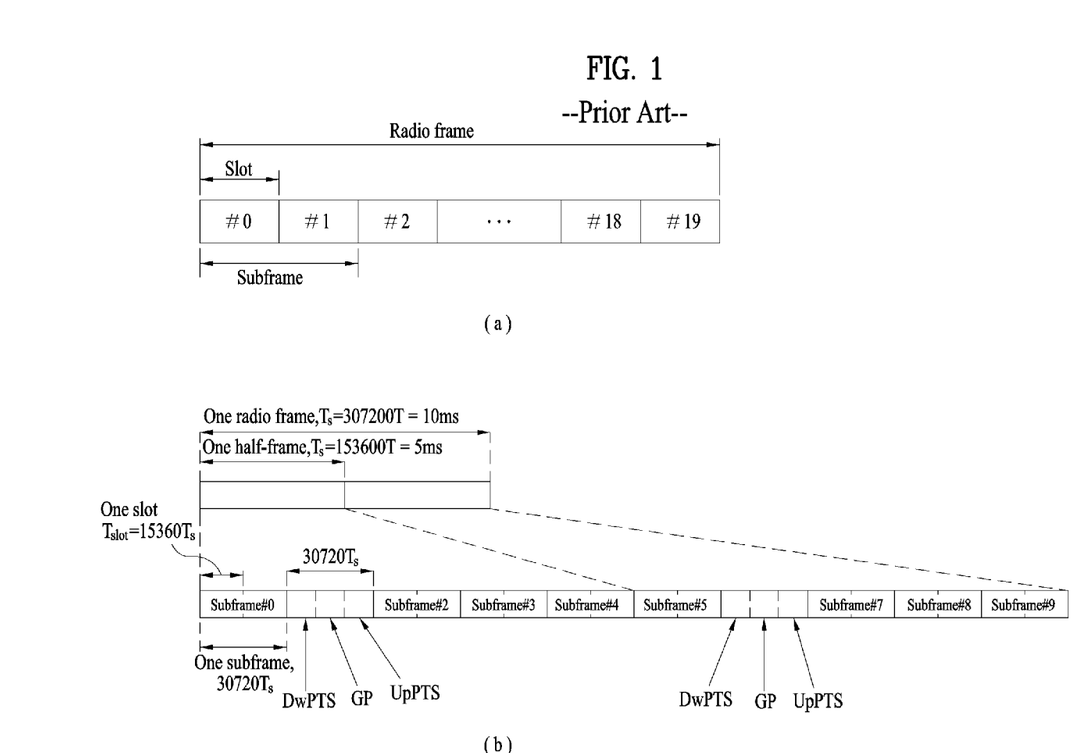
FIGS. 1(A) and 1(B) illustrate a radio frame structure.

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
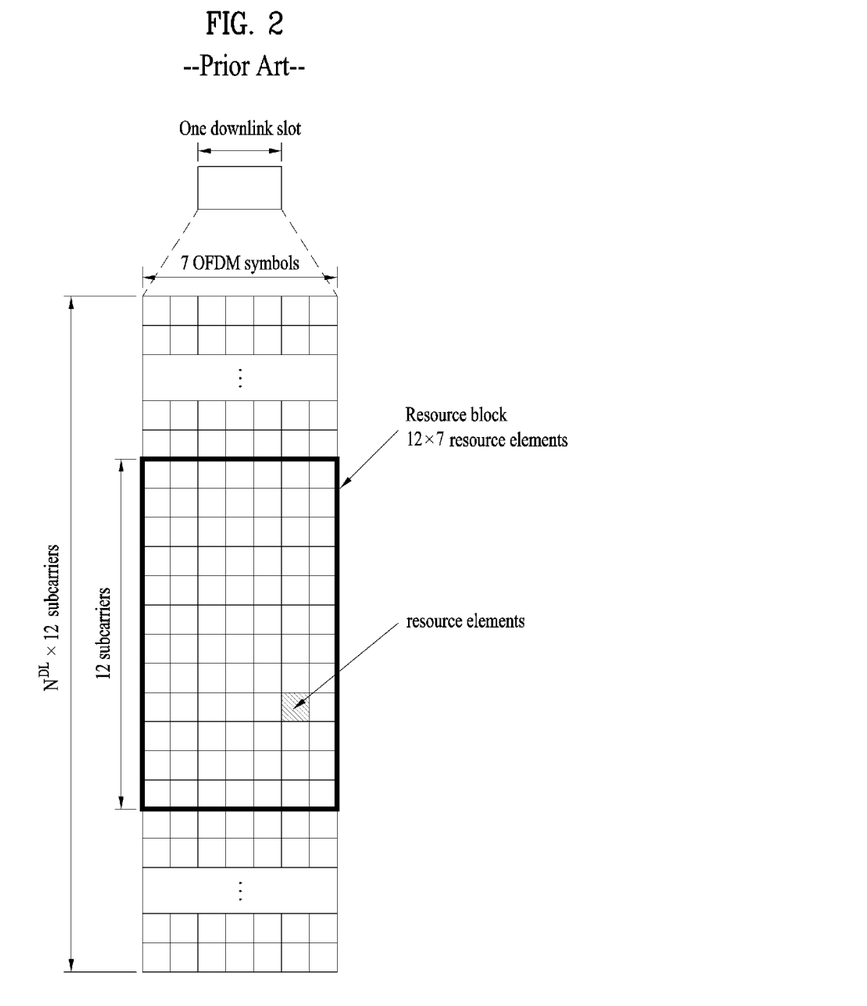
FIG. 2 is a diagram illustrating a resource grid for one downlink (DL) slot.

FIG. 2 is a diagram illustrating a resource grid of a DL slot. The DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
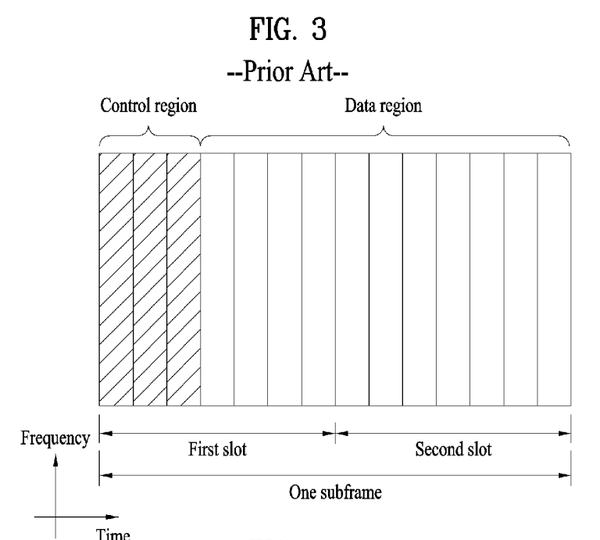
FIG. 3 is a diagram illustrating a DL subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
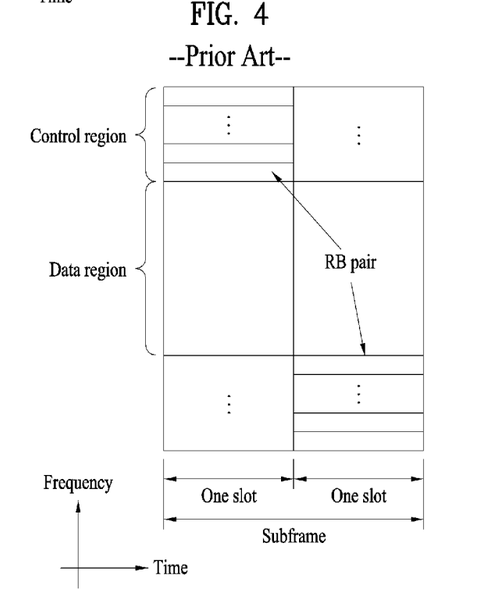
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) allowing the BS to measure UL channel quality at frequencies for different networks.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MB-SFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 5:
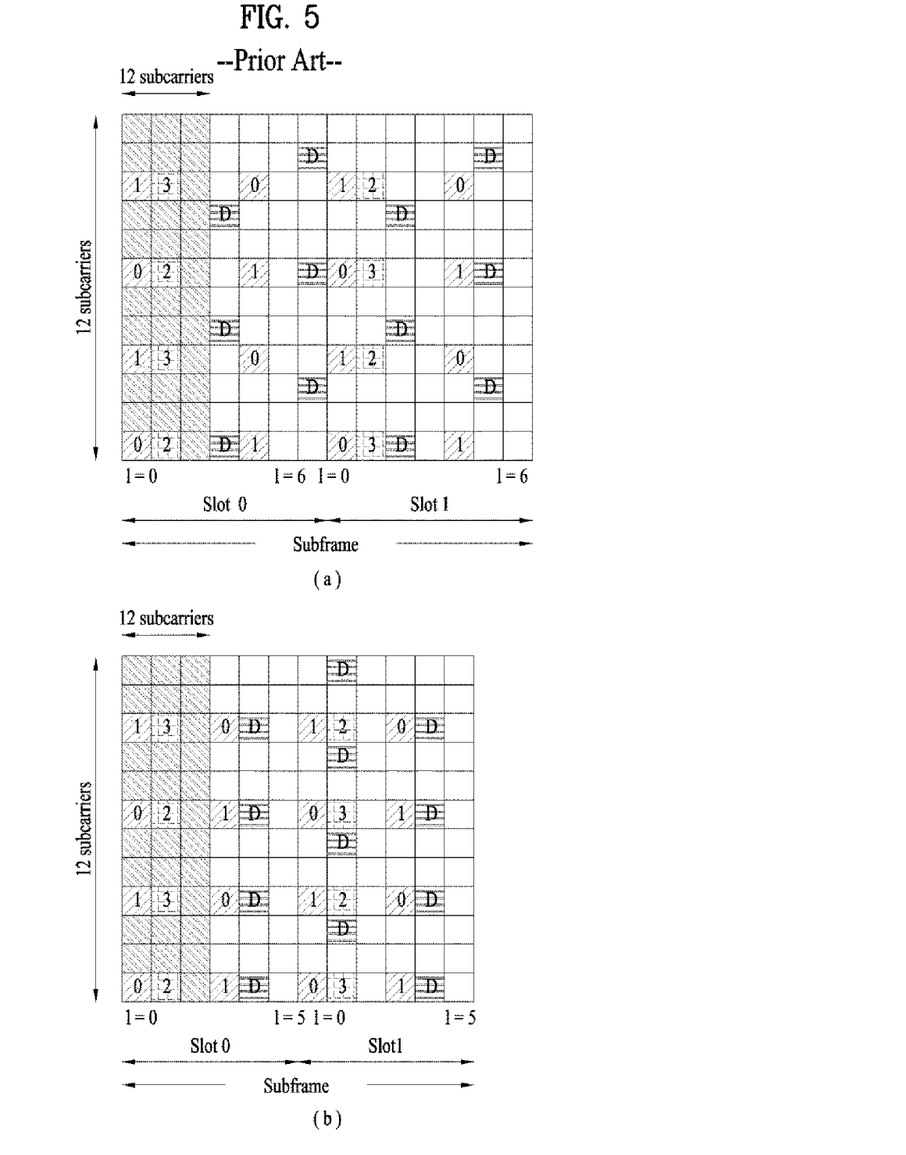
FIGS. 5(A) and 5(B) illustrate a reference signal.

FIG. 5 is a diagram illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

Information Flooding

Figure 6:
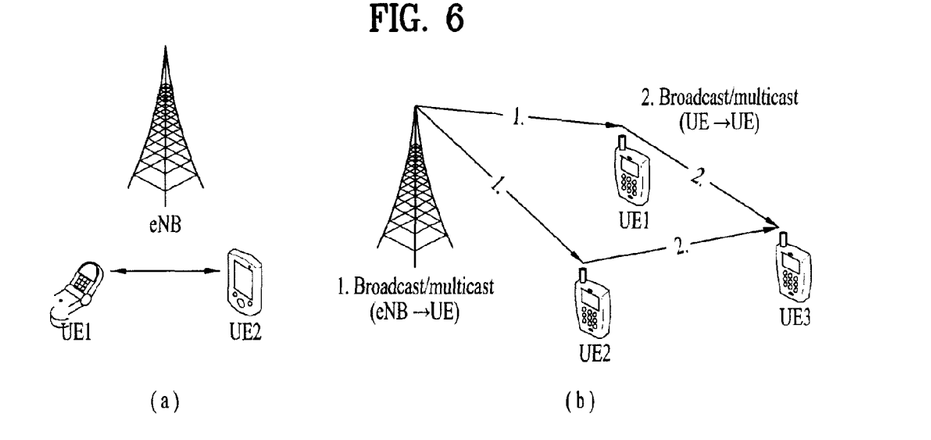

Hereinafter, a description will be given of information flooding according to one embodiment of the present invention. As shown in FIG. 6(a), information flooding may be embodied in a D2D communication system. Herein, information flooding may refer to transmitting information/a message received from an eNB (or a specific UE) for another UE. Specifically, referring to FIG. 6(b), UEs (UE1 and UE2) having received broadcast/multicast information from an eNB may transmit the received broadcast/multicast information in the D2D communication manner for another UE (UE3 in FIG. 6(b)). Although not shown in the figures, when receiving the broadcast/multicast information, UE3 may in turn transmit the received broadcast/multicast information for another UE.

To implement the aforementioned information flooding, UEs to deliver received information another UE (or other UEs) need to transmit the same information at the same time, a UE to received flooded information needs to receive the information transmitted from two or more UEs at a specific time and successfully decode the received information. There are other factors that need to be considered to implement information flooding. These factors will be described in detail below.

Figure 7:
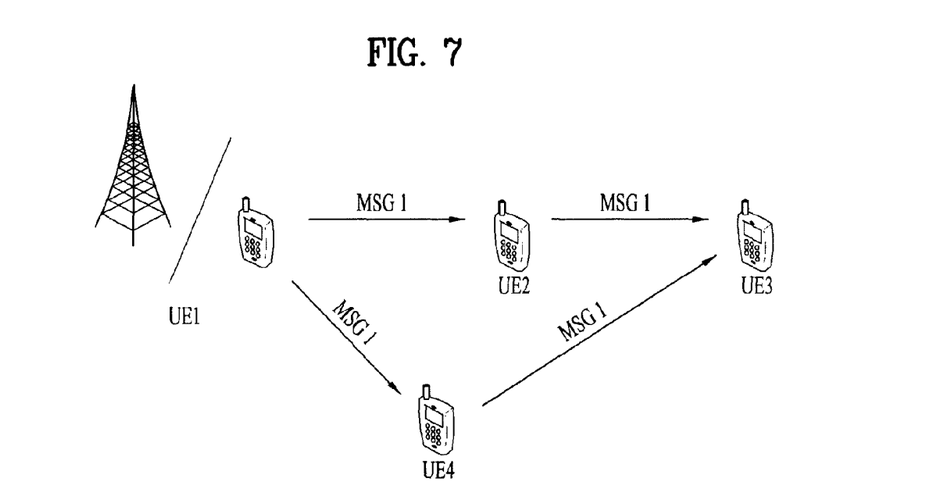
FIG. 7 is a diagram illustrating configuration of a system for flooding according to one embodiment of the present invention.

In the description given below, a situation as shown in FIG. 7 is basically assumed. Specifically, a UE to transmit a message for flooding will be defined as a first device (an eNB or one of UEs, UE1), a UE to receive the message (MSG 1) form the first device and determine whether to participate in flooding of the received message (MSG 1) will be defined as a second device (UE2), and a UE to receive the message (MSG 1) from the second device when the second device participates in flooding and transmits the message (MSG 1) received from the first device will be defined as a third device (UE3). In addition, a UE to determine whether to participate in flooding like the second device when receiving the message (MSG 1) transmitted from the first device and to transmit the received message (MSG 1) when determined to participate in flooding will be defined as a fourth UE (UE4). Hereinafter, it will be assumed that UE2 or UE4 transmits a message (MSG 1) for UE3 and that UE2 or UE4 has been determined to participate in flooding of the received message (MSG 1).

Resource Region for Flooding

When UE2 transmits the message received from UE1 to UE3, another UE. i.e., UE4 that receives the same message from UE1 at the same time may also transmit the message for UE3. In this case, for UE2 and UE4 to transmit the same message at the same time, a pre-configured resource region which is common to both UEs is needed. For example, an information flooding mode may be defined, and a corresponding transmission resource and channel may be separately allocated. Herein, the flooding mode may be an operation mode in which two or more devices can transmit/broadcast the same specific data using the same frequency region at the same time. This mode may be understood as an operation mode of a UE determined to participate in flooding, as described below.

Figure 8:
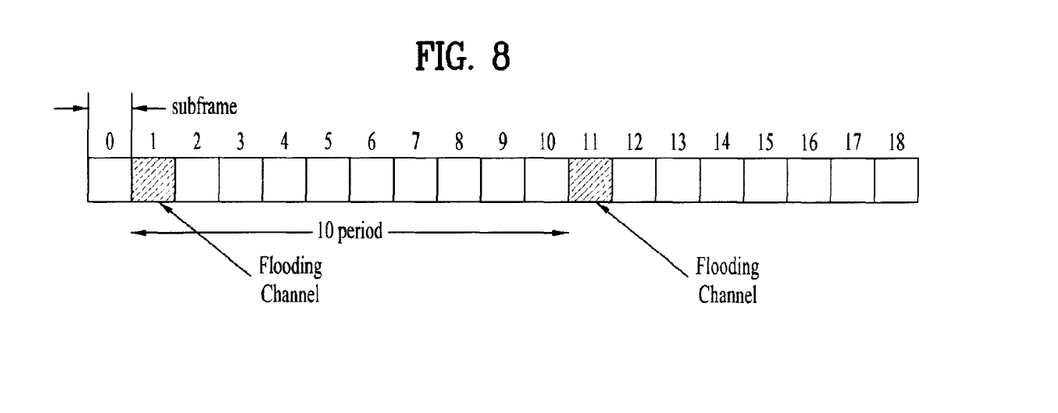
FIG. 8 is a diagram illustrating a resource region for flooding according to one embodiment of the present invention.

When the flooding mode is enabled, a specific frequency region (e.g., a (P)RB set) and a specific time region (e.g., a subframe) may be used in flooding. Allocation of a resource region (a specific frequency region and/or a specific time region) for flooding may be preset in the system, or may be determined semi-statically though, for example, higher layer signaling. For example, as shown in FIG. 8, a time region of resource regions for flooding may be set to be the first subframe of a frame.

RS for Flooding

In order for two or more devices to transmit the same data/message at the same time, the same RS needs to be used. That is, an RS related to the message which the second device receives from the first device and transmits for the third device and an RS related to the message that the fourth device received from the first device and transmits for the third device need to be in common. In other words, RSs related to specific messages transmitted at the same time need to be generated in the same manner.

There are two examples of the method for generating such RSs.

First, the first device (particularly, the eNB) may transmit information about a time/frequency region and an RS generation method to be used for flooding together with a message to be flooded. When receiving this message, the second device may transmit/broadcast the received message using an RS generated according to the indicated resource region and RS generation method. At this time, the transmitted/broadcast message may carry information about a time/frequency region and RS generation method to be used for flooding.

Second, a time/frequency region and RS generation method to be used for flooding may be preset. In this case, the corresponding information need not be added to separate signaling or a message to be flooded.

An RS related to flooding may change depending on the message for flooding. When the message for flooding changes, the resource region for flooding may also change. In any case, change of the RS/resource region according to message change should be common to the devices (the second device and the fourth device) to deliver a flooding message.

Hereinafter, change of an RS will be described in detail. In the case in which the RS generation methods change according to a specific parameter, the value of this parameter may depends on an identification number assigned to the message. Herein, the identification number may be a unique number assigned to each message for flooding. This may be intended to allow a device to recognize change of a message. For example, a message may have an identification number between 0 and 254 (when the identification number reaches the highest value, it returns to 0). The message transmitted first among the other messages may have identification number 0, and subsequent messages may have identification numbers sequentially incremented by 1. By substituting such message identification numbers in an RS generation equation related to flooding, a RS to be used in transmitting the corresponding message may be determined. Accordingly, if a message received by the UE2 is the same as a message previously received, the same RS as previously used may be used. If a message received by the UE2 is different from the message previously received, a new RS may be used.

Alternatively, RSs corresponding to message identification numbers may be stored in a lookup table.

Alternatively, while the RS generation equation is invariably used, an RS pattern may be shifted in the frequency region according to the message identification numbers. For example, a specific RS may be subject to frequency shift according change of the message in the pattern of (Message identification number mod n).

The descriptions above may be applied to determinate of a resource region for flooding changing according to change of the message, in the same/similar manner. For example, an equation for computing a resource region for flooding may be provided, and a parameter used for the equation may include an identification number assigned to the message.

CP for Flooding

When a message for flooding is transmitted from two or more devices (e.g., the second device and the fourth device), intersymbol interference (ISI) may occur. This is because a difference in propagation delay between the devices leads to delay spread on the side of a device (the third device) that receives the message even if the devices (the second device and the fourth device) participating in flooding are synchronized in the eNB. Further, it is not easy to accurately match the transmission timings of the devices participating in flooding. For example, when it is assumed that one uplink subframe is allocated for communication between UEs, the data transmissions from the respective devices may have a deviation by the value corresponding to timing advance (TA). Accordingly, delay spread of a signal that a flooding receiver receives from two or more flooding transmitters may have an even greater value than the delay spread of a single cell.

To solve this problem, a CP applied to a message transmitted for flooding may be set to be longer than the CP applied to the other messages. For example, only an extended CP may be used for the message transmitted for flooding. The extended CP has up to 17 μs in length, whereas the normal CP has up to 5 μs in length. Accordingly, with the extended CP, it becomes more probable that signals transmitted from two or more different devices reaches within the CP at the symbol start time of the receiver. Accordingly, the receiver may recognize the signals received from different transmitters in the same manner as in the case of a signal transmitted from one transmitter through multiple paths. The described extended CP is simply illustrative. An extended CP having a value greater than 17 μs may be used.

Participation in Flooding

If a message received from the first device by UE2 is intended for flooding, or the UE2 receives a command to participate in flooding from the first device, UE2 may voluntarily determine to participate in flooding.

The first device may explicitly signal through a message transmitted to the second device that the corresponding data/message is intended for flooding. When a device receives the message explicitly indicating that it is for flooding (hereinafter, referred to as "flooding message"), the device may be determined to participate in flooding. That is, upon receiving the message explicitly indicating that the message is intended for flooding, the second device may transmit the received message through a preset resource region a predetermined number of times. To discriminate between flooding messages, a field for recognizing a message type may be included in a frame/frame header of a physical layer or a higher layer. For example, referring to FIG. 9, after receiving a first message (MSG 1) explicitly indicating that the message is intended for flooding, the second device may transmit MSG 1 three times, which is a predetermined number of times. Thereby, the coverage of an eNB may be extended through flooding.

Alternatively, the second device may participate in flooding when it receives, from the first device, an indicator instructing the second device to participate in flooding. When receiving the indicator, the second device may participate in flooding by scanning the flooding resource region or transmitting the flooding message for the first time. Herein, the indicator may be a control signal of a physical layer or a higher layer. For example, the indicator may be a system information block (SIB) or RRC signaling.

Alternatively, a device which is specialized in flooding communication or configured to operate in the flooding mode according to Manual/Auto setting may voluntarily/actively participate in flooding. In this case, the device may become the original source of flooding. Particularly, this may be utilized in transmitting a discovery signal to (random) devices. With the methods described above, contention between devices for initial message transmission may occur, and accordingly first few symbols of a flooding resource region may be set as a contention interval.

If the message is identical to a message related to flooding in which the second device is already participating, the second device may be determined not to participate in flooding of the message. Specifically, while the second device having received, from the first device, a first message explicitly indicating that the message is intended for flooding is participating in flooding to transmit the first message a predetermined number of times, the first message transmitted from the fourth device having received the first message may be received by the second device. In this case, the second device may not participate in flooding since participation in flooding of the first message from the fourth device may cause unnecessary waste of resources.

Figure 9:
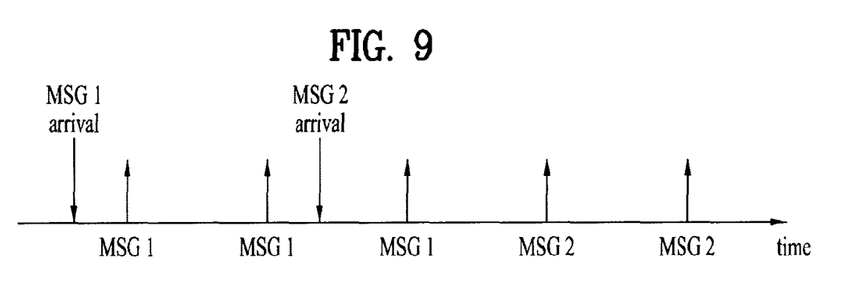
FIGS. 9 and 10 illustrate reception of a flooding message and participation in flooding according to one embodiment of the present invention.

Next, while the second device is participating in flooding to perform transmission a predetermined number of times, the second device may receive a message different from the message received from the first device. In this case, the second device may participate in flooding of the different message after the predetermined number of transmission is completed, the second device. For example, as shown in FIG. 9, if UE2 receives a second message (MSG 2) different from the first message (MSG 1) after transmitting the first message (MSG 1) twice, UE2 may transmit the second message after transmitting the first message a predetermined number of times, i.e., three times.

Alternatively, in the above case, the second device may participate in flooding of the received new message immediately upon receiving the message even before the predetermined number of transmissions is not completed. In this case, when flooding of the different message is performed, a new RS/RS pattern need to be used to avoid collision with the previous message as described above.

Description is given below of an exemplary methods for the devices (the second device and the fourth device) participating in flooding to receive a flooding message from an eNB or another device and transmit the same. A device having transmitted the first message using the participation scheme above terminates transmission after transmitting the flooding message a predetermined number of times. If there is a new message to be transmitted, the device may use an RS/RS pattern distinguishable from the existing message in the same resource region to transmit the new message. In switching between transmission and reception, after a predetermined number of transmissions is completed or transmission within a predetermined time interval is terminated, the devices may operate in the reception mode until a different message is received or for a predetermined number of times or a predetermined time interval. In this case, the number of times of performance or time interval may be differently defined for transmission and reception depending on the property of the message. For example, a device having received an original message transmits the same message a predetermined number of times and then switches to the reception mode to check whether there is another message to receive. At this time, if the received message is identical to the previously received message, it may be discarded. If the received message is different from the previously received message, the device may switch to the transmission mode again, transmit the received message a predetermined times, and then return to the reception mode. At this time, the device or eNB having transmitted the original message may exceptionally continue to operate in the transmission mode.

Figure 10:
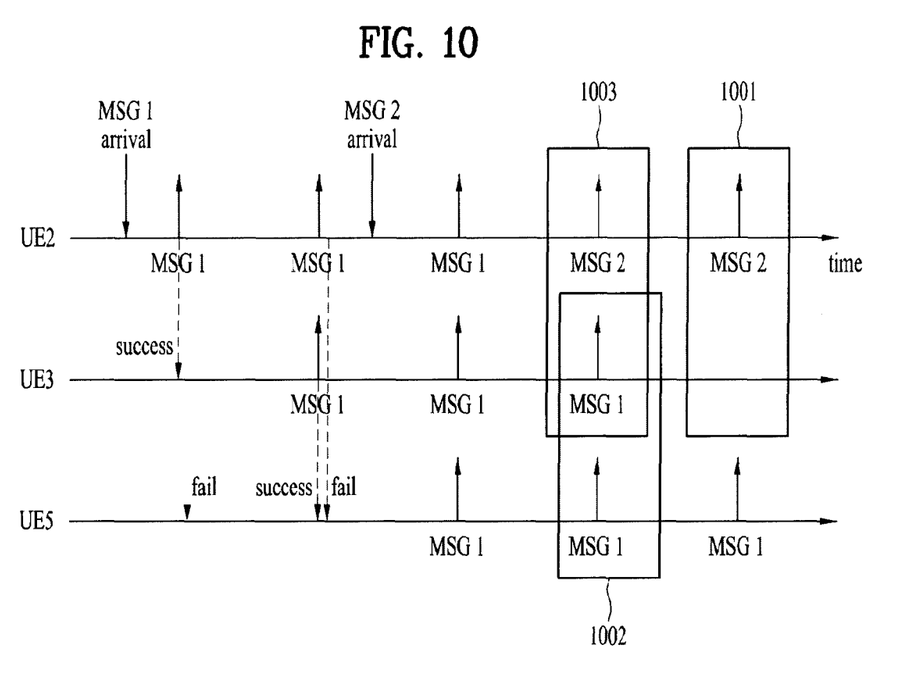

FIG. 10 illustrated the flooding operation described above. When receiving a first message (MSG 1) for flooding from the first device, the second device transmits/broadcasts the received first message a predetermined number of times (three times in FIG. 10). The third device having successfully received this message also participates in flooding of the first message and transmits/broadcasts the first message a predetermined number of times. When transmission is completed, the third device may switch to the reception mode and retrieve a message.

Although UE5 does not receive the first message transmitted from UE2, UE5 receive the first message flooded by UE3, thereby participating in flooding. The fifth device may not be positioned within the communication range of the first device/the second device, or the state of the channel between the fifth device and the second device may not be good. In the case which different devices (the third device and the fifth devices) perform transmission in the same resource region (1002), the same RS is used for the same message.

As shown in FIG. 10, the second device receives the second message (MSG 2) which is different from the first message after transmitting the first message twice. Accordingly, the second device can transmit the second message a predetermined number of times after transmitting the first message three times. In this case, the second device and the third device come to transmit different messages in the same resource region (1003), and thus interference between RS s occurs. Therefore, message identification numbers may be used to create sequences orthogonal to each other, or different RS patterns may be used for different messages to define RS resource regions differently in the frequency domain.

Other Considerations for Flooding

A transmitter in the flooding mode may transmit a synchronization signal and/or a control signal. This scheme may be useful particularly when the transmitter is synchronized with the eNB, but the receiver is not synchronized with the eNB. The receiver being not synchronized with the eNB refers to a case in which the receiver is present outside the coverage of the eNB, or a case in which the receiver is positioned in a coverage hole in the coverage of the eNB, where the receiver cannot properly receive signals from the eNB. Accordingly, a device positioned outside the coverage of the eNB needs to acquire information about a flooding data channel first to receive corresponding flooding data. Since the receiver does not have a connection with the eNB, this device may acquire the flooding channel information from the transmitter. In this case, the transmitter may include the channel information in a control signal which the transmitter transmits. Meanwhile, the receiver positioned outside the coverage needs to discover the transmitter and to be synchronized with the transmitter prior to data communication with the transmitter. To support the synchronization, the transmitter may periodically broadcast a synchronization signal.

In the flooding mode, different devices use the same frequency/time resources to transmit data. Accordingly, destructive interference may occur between signals transmitted for the devices over the full band in a specific channel (a frequency-flat channel). To avoid this destructive interference, the devices operating in the flooding mode may randomize phases of signals transmitted therefrom in the frequency domain. To allow the devices to have different phase values, values representing unique characteristics of the devices may be substituted for the parameters in calculating phase rotation values for the respective frequency resources. The parameters may include a device ID, a cell ID, a subframe index, or a combination thereof. In this case, phase rotation of RS s also needs to be implemented. For a device having a plurality of transmit antennas, a precoder may be randomly selected.

The eNB may issue a request for transmission/broadcast of the same specific data to two or more devices. At this time, the eNB may allocate independent/exclusive resource regions to different transmitters. For example, in D2D communication, the second device may be set to use subframe #1 of each frame, and the fourth device may be set to use subframe #2 of each frame. Alternatively, the second device and the fourth device may use independent RB sets at the same time. At this time, the third device may optionally determine a data reception region. Herein, the resource regions which can be allocated for D2D communication may be pre-agreed between the transmitter and the receiver. This may increase the probability that the third device positioned outside the coverage of the eNB detects the transmitter.

Figure 11:
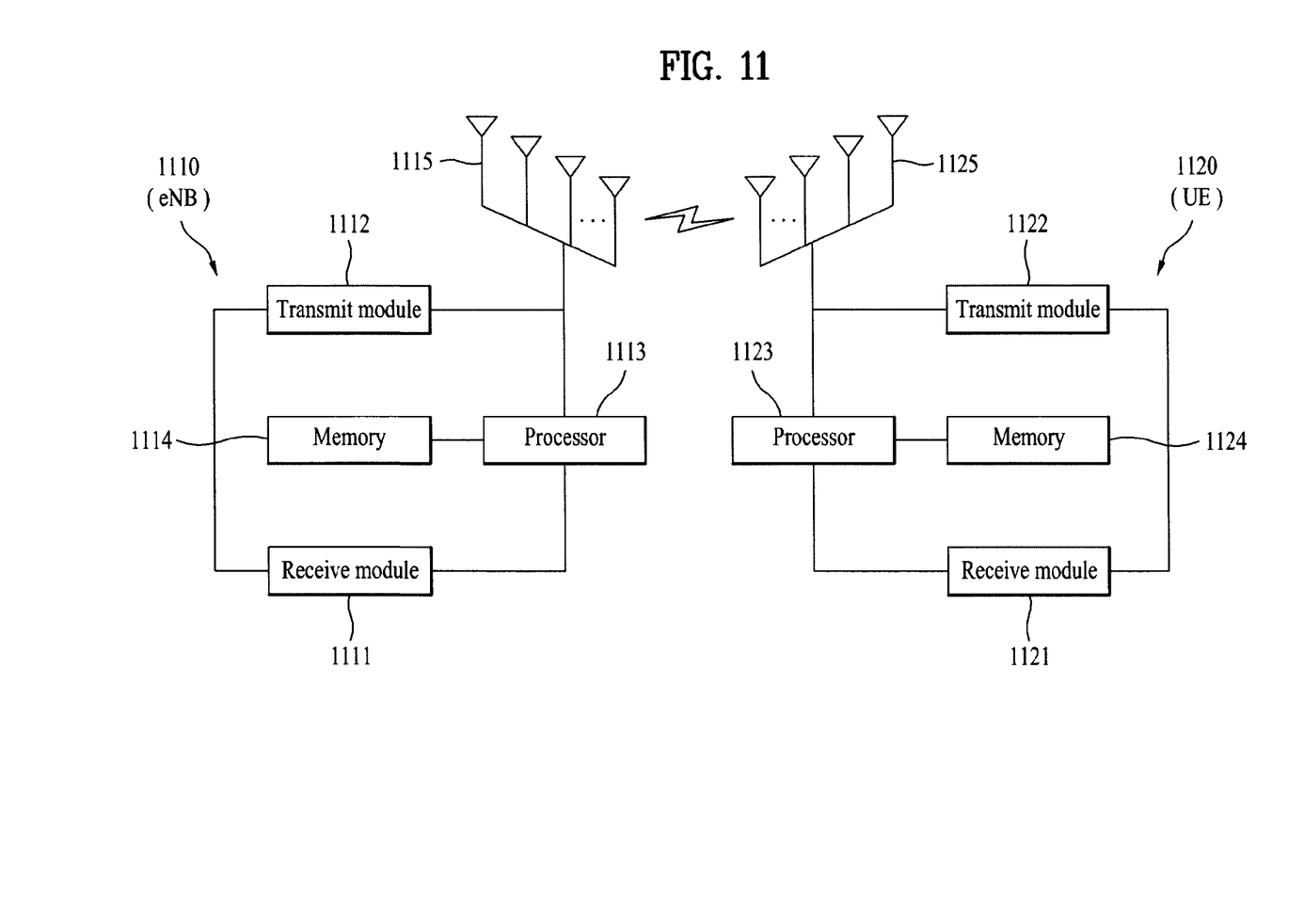
FIG. 11 is a diagram illustrating configuration of transceivers.

FIG. 11 is a diagram illustrating configurations of a eNB and a UE according to one embodiment of the present invention.

Referring to FIG. 11 an eNB 1110 may include a receive module 1111, a transmit module 1112, a processor 1113, a memory 1114, and a plurality of antennas 1115. The antennas 1115 represent a transmission point that supports MIMO transmission and reception. The receive module 1111 may receive various signals, data and information from a UE on uplink. The transmit module 1112 may transmit various signals, data and information to a UE on downlink. The processor 1113 may control overall operation of the eNB 1110.

The processor 1113 of the eNB 1110 according to one embodiment of the present invention may perform operations necessary for the embodiments described above.

Additionally, the processor 1113 of the eNB 1110 may function to computationally process information received by the eNB 1110 or information to be transmitted to the outside, etc. The memory 1114, which may be replaced with an element such as a buffer (not shown), may store the computationally processed information for a predetermined time.

Referring to FIG. 11, a UE 1120 may include a receive module 1121, a transmit module 1122, a processor 1123, a memory 1124, and a plurality of antennas 1125. The antennas 1125 mean that the UE supports MIMO transmission and reception. The receive module 1121 may receive various signals, data and information from an eNB on downlink. The transmit module 1122 may transmit various signals, data and information to the eNB on uplink. The processor 1123 may control overall operation of the UE 1120.

The processor 1123 of the UE 1120 according to one embodiment of the present invention may perform operations necessary for the embodiments described above.

Additionally, the processor 1123 may function to computationally process information received by the UE 1120 or information to be transmitted to the outside, and the memory 1124, which may be replaced with an element such as a buffer (not shown), may store the computationally processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1110 in FIG. 11 may also be applied to a relay which serves as a downlink transmitter or an uplink receiver, and description of the UE 1120 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting and receiving a signal by a second device in a wireless communication system, the method comprising:
   receiving, by the second device, a message and assistance information from a first device, the assistance information indicating a predetermined resource region and a reference signal generation method; and
   when the second device participates in flooding of the received message, transmitting, by the second device, the received message and the assistance information to a third device using the predetermined resource region and a reference signal generated by the reference signal generation method.

2. The method according to claim 1, wherein a frequency region in the predetermined resource region is identical to a resource region for receiving the message from the first device.

3. The method according to claim 1, wherein, when the message received from the first device indicates that the message is intended for flooding, or when the second device receives, from the first device, a command to participate in the flooding, the second device participates in the flooding.

4. The method according to claim 1, wherein, when the message is identical to a message related to flooding having the second device already participating therein, the second device does not participate in the flooding.

5. The method according to claim 1, wherein a cyclic prefix applied to the message transmitted for the third device is set to be longer than a cyclic prefix applied to a message intended for an operation other than flooding.

6. The method according to claim 1, wherein phase shift based on a parameter related to the second device is applied to the message transmitted for the third device.

7. The method according to claim 1, wherein the first device is one of a base station and a user equipment, and the second device and the third device are user equipment.

8. The method according to claim 1, wherein the second device transmits the received message and the assistance information to the third device a predetermined number of times, using the predetermined resource region and the reference signal generated by the reference signal generation method.

9. The method according to claim 8, wherein, when receiving a message different from the message received from the first device within the predetermined number of times, the second device participates in flooding of the different message after the predetermined number of times of the transmission is completed.

10. The method according to claim 8, wherein, when receiving a message identical to the message received from the first device within the predetermined number of times, the second device determines not to participate in flooding of the identical message.

11. The method according to claim 1, wherein the predetermined resource region is a subframe #1 among subframes #0 to #9.

12. A second device for transmitting and receiving a signal in a wireless communication system, comprising:
   a transmit module:
   a receive module; and
   a processor that controls the transmit module and the receive module to:
   receive a message and assistance information from a first device, the assistance information indicating a predetermined resource region and a reference signal generation method,
   transmit the received message and the assistance information to a third device using the predetermined resource region and a reference signal generated by the reference signal generation method, when the second device participates in flooding of the received message.

* * * * *